United States Patent
Moser

(10) Patent No.: US 10,615,556 B2
(45) Date of Patent: Apr. 7, 2020

(54) CONNECTOR-SOLDERING AID

(71) Applicant: Helmholtz-Zentrum Geesthacht Zentrum für Material-und Küstenforschung GmbH, Geesthacht (DE)

(72) Inventor: Jan Moser, Geesthacht (DE)

(73) Assignee: Helmholtz-Zentrum Geesthacht Zentrum für Material-und Küstenforschung GmbH, Geesthacht (DE)

(*) Notice: Subject to any disclaimer, the term of this patent is extended or adjusted under 35 U.S.C. 154(b) by 418 days.

(21) Appl. No.: 15/611,444

(22) Filed: Jun. 1, 2017

(65) Prior Publication Data

US 2018/0013252 A1 Jan. 11, 2018

(30) Foreign Application Priority Data

Jul. 8, 2016 (EP) .................................. 16178535

(51) Int. Cl.
*H01R 43/02* (2006.01)
*B23K 3/08* (2006.01)
*B23K 101/32* (2006.01)
*B23K 101/38* (2006.01)

(52) U.S. Cl.
CPC ......... *H01R 43/0263* (2013.01); *B23K 3/087* (2013.01); *B23K 2101/32* (2018.08); *B23K 2101/38* (2018.08); *Y10T 29/53209* (2015.01)

(58) Field of Classification Search
CPC H01R 43/0263; B23K 3/087; B23K 2101/32; B23K 2101/38; Y10T 29/53209; Y10T 29/53; Y10T 29/53174

USPC .......................... 29/747, 745, 729, 700, 739
See application file for complete search history.

(56) References Cited

U.S. PATENT DOCUMENTS

| 2,221,108 A | 11/1940 | Rathbun |
| 2,397,052 A | 3/1946 | Schietinger |
| 5,297,339 A * | 3/1994 | Morgenstern ........... B25B 11/00 269/43 |
| 2013/0270758 A1 | 10/2013 | Wittliff, III et al. |

OTHER PUBLICATIONS

European Search Report in related European Application No. 16178535.7 dated Jan. 24, 2017.
Soldering Irons & Jigs Radical RC, XP 055332027 A, "http://web.archive.org/web/20160423020050" and "http://www.radicalrc.com/category/501dering-Irons--Jigs-201", pp. 1-12.

* cited by examiner

*Primary Examiner* — Peter Dungba Vo
*Assistant Examiner* — Azm A Parvez
(74) *Attorney, Agent, or Firm* — Marshall, Gerstein & Borun LLP

(57) ABSTRACT

A connector-soldering aid (1) for soldering single and/or cable wires to a connector comprises a connector mount (5) with a first stand (9) and a cable mount (7) with a second stand (31). The connector mount (5) has a base body (17), which is arranged on the first stand (9) and is rotatable relative to the latter about a fixed axis of rotation (19). The connector mount (5) further comprises a replaceable attachment (21) with a connector receiver and a centring device (23) for centring the attachment (21). The centring device (23) is arranged on the base body (17) and is further formed to centre the attachment (21) such that the connector receiver is positioned centrally in relation to the axis of rotation (19) of the base body (17).

34 Claims, 3 Drawing Sheets

CONNECTOR-SOLDERING AID

CROSS REFERENCE TO RELATED APPLICATION

The benefit of priority to European Patent Application No. 16178535.7 filed Jul. 8, 2016, is hereby claimed and the disclosure is incorporated herein by reference in its entirety.

BACKGROUND

Field of the Disclosure

The present invention relates to a connector-soldering aid for soldering single and/or cable wires to a connector. It comprises a connector mount with a first stand and a cable mount with a second stand. The connector mount has a base body, which is arranged on the first stand and is rotatable relative to the latter about an axis of rotation.

BRIEF DESCRIPTION OF RELATED TECHNOLOGY

The soldering of single and/or cable wires to connector contacts is one of the typical tasks often carried out in an electronics workshop. When soldering single and/or cable wires to connector contacts, a technician usually operates the soldering iron with one hand and guides the soldering wire with the other hand. The technician often finds himself faced with the problem of a lack of a suitable fixing or holding device of the connector to be soldered, which in many cases has a round shape and/or very small dimensions, and of the single and/or cable wires to be soldered.

In order to achieve the desired soldering outcome, a good preparation of the soldering process, e.g. by bringing the single and/or cable wires into a position in which they can be soldered directly, is essential. Undesired movements of the connector during the soldering process, which can lead to uncontrolled results, also have to be avoided. In practice, therefore, a holder is often alternatively improvised, precisely in the case of round connectors, in order thus to hold the connector during soldering and to achieve the desired result.

A connector-soldering aid which fixes the connector during the soldering process is for example the connector mount "Napier's Solder Jig Guillotine Connector Clamp Kit", which is advertised on the homepage of www.radicalrc.com (as at 24.05.2016), and which is an accessory part for the soldering aid "Napier's Solder Jig Bench", which also has a cable clamp. The connector mount comprises a clamping mechanism, in which a connector is fixed in the connector mount by lateral clamping. Furthermore the connector mount is secured magnetically to a stand protruding from the soldering aid and is both freely rotatable and movable.

However, a precise alignment of the connector relative to the single and/or cable wires to be soldered or to the cable in the cable clamp is problematical when the connector rotates because the connector mount is freely movable and rotatable about any centre of rotation. Because of the design of the connector mount it can also be the case that the connector is held by the connector mount by its contacts that are not to be soldered, i.e. the connector side that is to be plugged in, instead of by its housing. This can lead to damage to the contacts, which in the extreme case can have the result that the connector cannot be plugged into an associated coupling.

SUMMARY

The object of the invention is therefore to provide a connector-soldering aid and a method for soldering connectors to single and/or cable wires with the aid of a connector-soldering aid which avoids the above-described problems.

The features of the independent claims 1 and 14 serve to achieve this object. Advantageous embodiments of the device are the subject of the associated dependent claims.

The connector-soldering aid according to the invention is characterized in that the axis of rotation of the base body is fixed. In addition, the connector mount further comprises a replaceable attachment with a connector receiver and a centring device for centring the attachment. The centring device is arranged on the base body and is further formed to centre the attachment such that the connector receiver is positioned centrally in relation to the axis of rotation of the base body.

The method according to the invention uses the connector-soldering aid according to the invention to solder connectors to single and/or cable wires.

With the aid of the device according to the invention and by using the method according to the invention, it is possible to work precisely. The single and/or cable wires fixed with the aid of the cable mount can be brought into the desired position on a connector fixed in the connector receiver of the attachment before soldering. Because of the fixing of the connector on the one hand and the fixing of the single and/or cable wires on the other hand, these remain in position until completion of the soldering process. The quality of the result of the work is thereby improved.

Within the framework of the present invention, by the wording that the connector receiver is positioned centrally in relation to the axis of rotation of the base body is meant that a centre of area of the connector receiver lying on the end face of the attachment lies on the axis of rotation of the base body.

The central positioning of the connector receiver relative to the axis of rotation of the base body has the effect that the geometric centre of gravity of a connector which is located in the connector receiver of the attachment lies on the axis of rotation of the base body. As a result, the connector fixed in the connector receiver can be rotated, together with the base body, about its geometric centre of gravity. This has the advantage that during the soldering process the single and/or cable wires to be soldered after a rotation likewise only need to be rotated, and not repositioned. For example, the attachment has a circular outer contour, wherein the connector receiver is arranged such that a centre of area of the connector receiver lying in the end face of the attachment coincides with the centre of the circular attachment.

A further advantage of the invention is that the time needed for soldering the single and/or cable wires to the connector contacts is reduced. There is no longer any need to construct improvised auxiliary structures for fixing the connector. For example, the connector-soldering aid can comprise several different attachments, which each have different connector receivers. It is thereby made possible for any connector shape to be able to be fixed quickly by suitable, adapted attachments. Examples of connector shapes can be typical commercially available, i.e. available on the market, connectors such as e.g. RCA connectors, DVI connectors, FireWire connectors, phone connectors, PS/2 connectors, S-Video connectors, VGA connectors, D-Sub connectors, LEMO connectors, or individual special shapes. Finally, the individual attachments for each housing shape of a connector can be formed such that they hold the connector by its housing and not by its outer contacts.

According to an embodiment the cable mount has a clamping device, wherein the axis of rotation of the base body points in the direction of the clamping device of the cable mount. The axis of rotation is preferably aligned to the clamping device. This has the advantage that in the case of a rotation of a connector located in the attachment, during the soldering process, the single and/or cable wires to be soldered likewise only need to be rotated for soldering, instead of needing to be repositioned because of a misalignment.

According to a preferred embodiment the clamping device of the cable mount is rotatable and optionally lockable relative to the second stand about a second axis of rotation, wherein the axis of rotation of the base body and the second axis of rotation of the clamping device are arranged parallel to each other. Optionally the axis of rotation of the base body and the second axis of rotation of the clamping device are in line with each other. This property simplifies the handling of the single and/or cable wires to be soldered or of the clamped cable after a rotation of the connector in the attachment.

According to a further embodiment the connector mount has a locking mechanism which is formed to lock the base body in predefined angular steps about the axis of rotation or to make it possible to manually lock the base body in angular steps which can be selected as desired. The soldering process is thereby further simplified, as the connector is automatically locked in different angular positions or can be manually locked.

The locking mechanism is advantageously formed to lock the base body in 90-degree angular steps about the axis of rotation. In the resulting four different positions, all single and/or cable wires as well as all connector contacts of the usual connectors are usually freely accessible.

The centring device preferably has at least one guide element which is arranged on the base body and the attachment comprises at least one recess, wherein the recess can be fitted onto the guide element. The guide elements are preferably formed as cylindrical protrusions or guide pins and the recesses are formed as correspondingly shaped bore holes.

According to an embodiment the attachment is formed to clamp, grip or, by means of screws or magnets, fix the connector in the connector receiver. It is understood that other securing possibilities which make a temporary fixing of the connector in the connector receiver possible are also conceivable.

According to a preferred embodiment the attachment is clamped, gripped, screwed or magnetically fixed to the base body. This makes a simple release, and thus change, of the corresponding attachment possible.

Optionally the connector receiver of the attachment is suitable for receiving a commercially available connector. Within the framework of the present invention, by the term "commercially available connectors" is meant typical connectors available on the market, such as for example RCA connectors, DVI connectors, FireWire connectors, phone connectors, PS/2 connectors, S-Video connectors, VGA connectors, D-Sub connectors, LEMO connectors, or individual special shapes.

According to a further embodiment the connector receiver of the attachment is suitable for receiving a D-Sub connector and/or a LEMO connector. This makes a wide field of use of the connector-soldering aid possible.

Optionally the connector mount has an additional clamp, preferably the clamp is secured to a flexible arm. With such a clamp, single wires can be positioned in a targeted manner, before the soldering process, in the immediate proximity of the connector contact to which the single wire is to be soldered. The clamp can, for example, be secured to the first stand.

An embodiment in which the connector mount and the cable mount are secured on a board is particularly preferred. The connector mount and the cable mount are preferably secured at distances from each other which can be selected differently. The connector-soldering aid can thereby be adapted to the individual properties of the single and/or cable wires to be soldered, such as for example a high or low degree of flexibility of the single and/or cable wires. In the case of large cable cross sections, a rigid single and/or cable wire itself requires a greater distance from the connector compared with highly flexible material, for example, in order to guarantee the necessary bending radii of the single and/or cable wires.

According to an embodiment the connector mount and/or the cable mount are height-adjustable. This has the advantage that the cable mount can be aligned relative to the centre of the connector even in the case of large diameters of the single wires or of the cables routed to the connector.

BRIEF DESCRIPTION OF THE DRAWINGS

The invention is further explained in the following with reference to drawings merely showing embodiments. These figures are to be understood by way of example and do not limit the invention. There are shown in FIG. 1 a side view of the connector-soldering aid according to the invention, FIG. 2 a perspective view of the connector-soldering aid according to the invention from FIG. 1 with an attachment removed from the base body, and FIG. 3 a top view of an embodiment of an attachment for a D-Sub connector.

DETAILED DESCRIPTION

Figure 1:
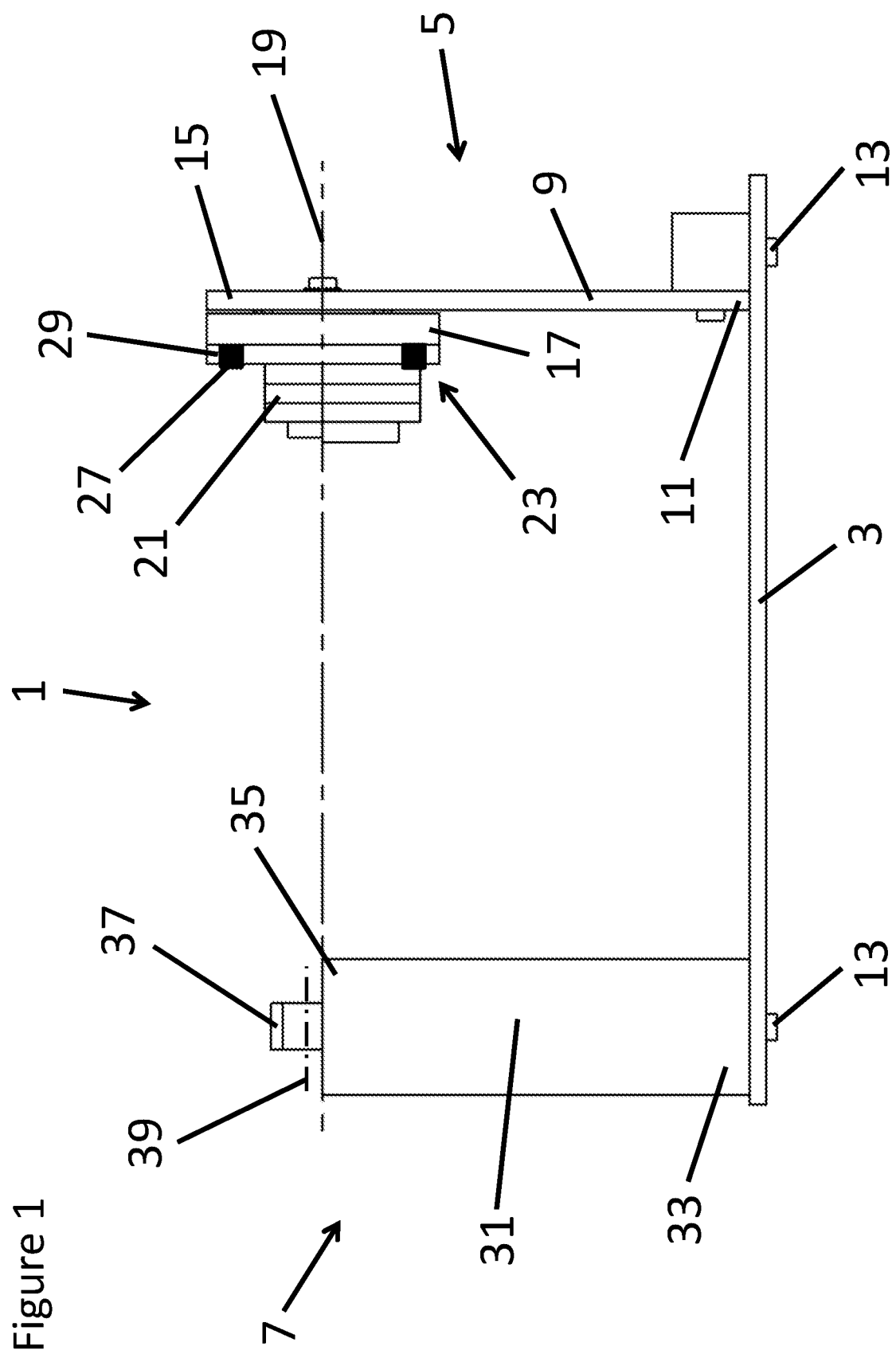
Figure 2:
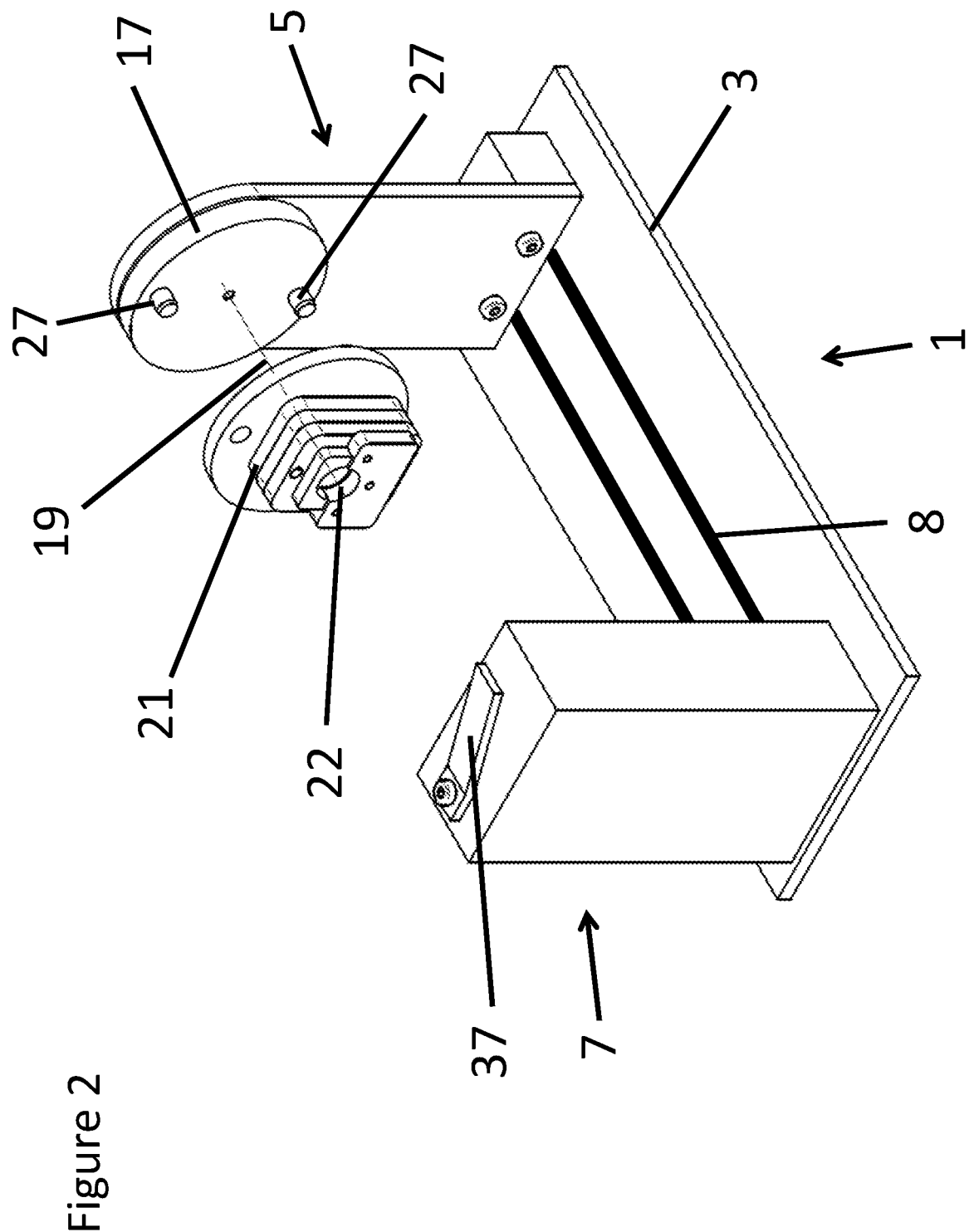

A connector-soldering aid 1 for soldering single and/or cable wires to a connector (not represented) is shown in FIGS. 1 and 2. The connector-soldering aid 1 comprises a board 3, on which a connector mount 5 and a cable mount 7 are arranged spaced apart from each other. The board 3 has guide rails 8, along which the connector mount 5 and the cable mount 7 can be moved and secured in their desired positions.

The connector mount 5 comprises a first stand 9, which is fixed to the board 3 by its first end 11 with the aid of securing means 13. At a second, opposite end 15, a base body 17 is arranged which is rotatable relative to the stand 9 about a fixed axis of rotation 19. The first stand 9 can be formed height-variable. Optionally the connector mount 5 has a locking mechanism which is formed to lock the base body 17 in predefined angular steps, preferably in angular steps of 90 degrees, about the axis of rotation 19.

The connector mount 5 further comprises a replaceable attachment 21 with a connector receiver 22 and a centring device 23 for centring the attachment 21. The centring device 23 is arranged on the base body 17 and is further formed to centre the attachment 21 such that the connector receiver 22 is positioned centrally in relation to the axis of rotation 19 of the base body 17.

An attachment 21 with a connector receiver 22 for a LEMO plug connector is shown in FIGS. 1 and 2. It is understood, however, that other attachments 21 with connector receivers for further connector types can also be used, such as for example RCA connectors, DVI connectors, FireWire connectors, phone connectors, PS/2 connectors, S-Video connectors, VGA connectors and D-Sub connectors.

The centring device 23 has guide elements in the form of guide pins 27, which are arranged on the base body 17 and run parallel to the axis of rotation 19. The attachment 21 has corresponding recesses 29, which can be fitted onto the guide pins 27. However, it is likewise conceivable for the base body 17 to have recesses and for the attachment 21 to have guide elements in the form of guide pins or other suitable guide elements.

The attachment 21 fitted onto the guide pins 27 can be held on the base body 17 for example by magnets or a screwing, clamping or gripping device.

The cable mount 7 has a second stand 31, which is mounted on the board 3 by its first end 33 likewise with securing means 13. The second stand 31 can likewise be formed height-variable.

Furthermore, at a second end 35 the second stand 31 has a clamping device 37 for receiving and fixing cables or cable and/or single wires. The cable or the cable wires can be easily removed from the clamping device 37 and rotated about a second axis of rotation 39, which runs parallel to the axis of rotation 19 of the base body 17. Optionally the clamping device 37 with the cable or the cable wires is arranged rotatable and/or lockable relative to the second stand 31 about the second axis of rotation 39. Optionally the axis of rotation 19 of the base body 17 and the second axis of rotation 39 of the clamping device 37 are in line with each other.

Figure 3:
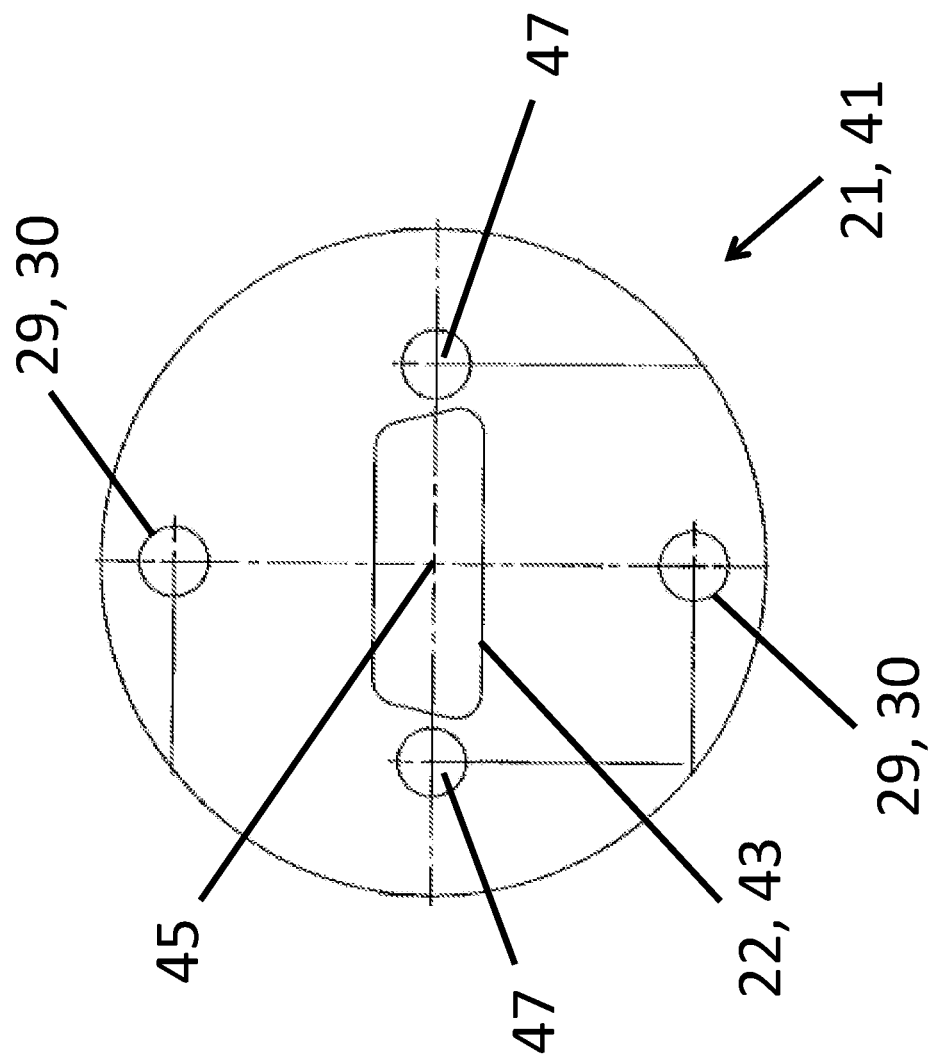

FIG. 3 shows an embodiment of the attachment 21 for a commercially available D-Sub connector in detail. The attachment 21 is formed as a disc 41, which has a connector receiver 22. The connector receiver 22 is an opening 43 which has the shape of a D-Sub connector housing. The opening 43 is placed centrally in the attachment 21, with the result that a centre of area 45 of the opening 43 lying in the drawing plane of FIG. 3 coincides with the centre of the disc 41. If the attachment 21 is fitted onto the guide pins 27, the centre of area 45 of the connector receiver 22 or the centre of the disc 41 lies on the axis of rotation 19 of the base body 17.

The attachment 21 is furthermore provided with two recesses 29, which can be formed as bore holes 30 or for example in the manner of a blind hole. The number of recesses 29 preferably corresponds to the number of guide pins 27 secured on the base body 17 (FIG. 2). It is understood that other means suitable for centring the attachment 21 on the base body 17 are also conceivable.

The attachment 21 furthermore has two magnets 47, which laterally hold the D-Sub connector which is received in the connector receiver 22. However, it is also conceivable for the connector to be held in the connector receiver 22 by a clamping device, a gripping device or a screw connection or by combinations of a magnetic holder, a clamping device, a gripping device and/or a screw connection.

The method for joining connectors to single and/or cable wires with the aid of the connector-soldering aid 1 according to the invention is to be described in the following.

The connector-soldering aid 1, the single and/or cable wires and the connector to be soldered are provided in a first method step.

Depending on the connector to be soldered, an attachment 21 is then selected, the connector receiver 22 of which is suitable for receiving the corresponding connector.

The attachment 21 is pushed with its recesses in the form of bore holes 29 onto the guide pins 27 on the base body 17 and fixed on the base body 17. The attachment 21 is thereby centred on the base body 17 with the aid of the centring device 23 such that the connector receiver 22 is positioned centrally in relation to the axis of rotation 19 of the base body 17.

The connector to be soldered is inserted into the connector receiver 22 and fixed there with the aid of magnets 47.

The single and/or cable wires to be soldered are clamped in the clamping device 37 of the cable mount 7.

Optionally, single wires can be positioned in the immediate proximity of the connector to which the single wire is to be soldered with the aid of an additional clamp (not represented). The clamp can be secured for example to the first stand 9.

The single and/or cable wires are then soldered to the connector contacts of the connector, wherein the connector can be rotated with the connector receiver 22 and the base body 17 about the first axis of rotation 19 and optionally the single and/or cable wires can be rotated about the second axis of rotation 39. Further optionally the connector can be locked in individual angular steps with the aid of a locking mechanism.

After completion of the soldering process, the connector is removed from the connector receiver 22 and the single and/or cable wires are removed from the clamping device 37.

The invention claimed is:

1. A connector-soldering aid for soldering single and/or cable wires to a connector, comprising:
    a connector mount comprising:
        a first stand,
        a base body arranged on the first stand, wherein the base body is rotatable relative to the first stand about an axis of rotation,
        a replaceable attachment with a connector receiver, and
        a centering device arranged on the base body for centering the replaceable attachment such that the connector receiver is positioned centrally in relation to the axis of rotation of the base body; and
    a cable mount comprising a second stand and a clamping device,
    wherein:
    the axis of rotation of the base body is fixed,
    the axis of rotation of the base body points in a direction of the clamping device of the cable mount, and
    the clamping device of the cable mount is rotatable and lockable relative to the second stand about a second axis of rotation, wherein the axis of rotation of the base body and the second axis of rotation of the clamping device are arranged parallel to each other.

2. The connector-soldering aid according to claim 1, wherein the connector mount further comprises a locking mechanism, which is adapted to lock the base body in predefined angular steps about the axis of rotation of the base body, or is adapted to allow manual locking of the base body in angular steps which can be selected as desired.

3. A connector-soldering aid for soldering single and/or cable wires to a connector, comprising:
    a connector mount comprising:
        a first stand and a base body arranged on the first stand, wherein the base body is rotatable relative to the first stand about an axis of rotation, a replaceable attachment with a connector receiver, a centering device arranged on the base body for centering the replaceable attachment such that the connector receiver is positioned centrally in relation to the axis of rotation of the base body, and a locking mechanism, which is adapted to lock the base body in predefined angular steps about the axis of rotation of the base body, or is adapted to allow manual locking of the base body in angular steps which can be selected as desired; and a cable mount comprising a second stand, wherein:

the axis of rotation of the base body is fixed, and the locking mechanism is adapted to lock the base body in 90-degree angular steps about the axis of rotation of the base body.

4. A connector-soldering aid for soldering single and/or cable wires to a connector, comprising:

a connector mount comprising:

a first stand, a base body arranged on the first stand, wherein the base body is rotatable relative to the first stand about an axis of rotation, a replaceable attachment with a connector receiver, and a centering device arranged on the base body for centering the replaceable attachment such that the connector receiver is positioned centrally in relation to the axis of rotation of the base body; and a cable mount comprising a second stand, wherein:

the axis of rotation of the base body is fixed, and the centering device has at least one guide element, which is arranged on the base body, and the replaceable attachment comprises at least one recess, wherein the recess can be fitted onto the guide element.

5. The connector-soldering aid according to claim 1, wherein the replaceable attachment clamps, grips, or fixes by screws or magnets the connector in the connector receiver.

6. The connector-soldering aid according to claim 1, wherein the replaceable attachment is clamped, gripped, screwed or magnetically fixed to the base body.

7. The connector-soldering aid according to claim 1, wherein the connector receiver of the replaceable attachment is adapted to receive a commercially available connector.

8. The connector-soldering aid according to claim 1, wherein the connector receiver of the replaceable attachment is adapted to receive a D-Sub connector and/or a LEMO connector.

9. The connector-soldering aid according to claim 1, wherein the connector mount has a clamp.

10. The connector-soldering aid according to claim 1, wherein the connector mount and the cable mount are secured on a board.

11. The connector-soldering aid according to claim 1, wherein the connector mount and/or the cable mount are height-adjustable.

12. A method for joining connectors to single and/or cable wires using the connector-soldering aid according to claim 1.

13. The connector-soldering aid according to claim 9, wherein the clamp is secured to a flexible arm.

14. The connector-soldering aid according to claim 10, wherein the connector mount and the cable mount are secured on the board at distances from each other which can be selected differently.

15. The connector-soldering aid according to claim 3, wherein the replaceable attachment clamps, grips, or fixes by screws or magnets the connector in the connector receiver.

16. The connector-soldering aid according to claim 3, wherein the replaceable attachment is clamped, gripped, screwed or magnetically fixed to the base body.

17. The connector-soldering aid according to claim 3, wherein the connector receiver of the replaceable attachment is adapted to receive a commercially available connector.

18. The connector-soldering aid according to claim 3, wherein the connector receiver of the replaceable attachment is adapted to receive a D-Sub connector and/or a LEMO connector.

19. The connector-soldering aid according to claim 3, wherein the connector mount has a clamp.

20. The connector-soldering aid according to claim 3, wherein the connector mount and the cable mount are secured on a board.

21. The connector-soldering aid according to claim 3, wherein the connector mount and/or the cable mount are height-adjustable.

22. A method for joining connectors to single and/or cable wires using the connector-soldering aid according to claim 3.

23. The connector-soldering aid according to claim 19, wherein the clamp is secured to a flexible arm.

24. The connector-soldering aid according to claim 20, wherein the connector mount and the cable mount are secured on the board at distances from each other which can be selected differently.

25. The connector-soldering aid according to claim 4, wherein the replaceable attachment clamps, grips, or fixes by screws or magnets the connector in the connector receiver.

26. The connector-soldering aid according to claim 4, wherein the replaceable attachment is clamped, gripped, screwed or magnetically fixed to the base body.

27. The connector-soldering aid according to claim 4, wherein the connector receiver of the replaceable attachment is adapted to receive a commercially available connector.

28. The connector-soldering aid according to claim 4, wherein the connector receiver of the replaceable attachment is adapted to receive a D-Sub connector and/or a LEMO connector.

29. The connector-soldering aid according to claim 4, wherein the connector mount has a clamp.

30. The connector-soldering aid according to claim 4, wherein the connector mount and the cable mount are secured on a board.

31. The connector-soldering aid according to claim 4, wherein the connector mount and/or the cable mount are height-adjustable.

32. A method for joining connectors to single and/or cable wires using the connector-soldering aid according to claim 4.

33. The connector-soldering aid according to claim 29, wherein the clamp is secured to a flexible arm.

34. The connector-soldering aid according to claim 30, wherein the connector mount and the cable mount are secured on the board at distances from each other which can be selected differently.

* * * * *